US006844821B2

(12) United States Patent
Swartzel et al.

(10) Patent No.: US 6,844,821 B2
(45) Date of Patent: Jan. 18, 2005

(54) ELECTRONIC DISPLAY SYSTEM TAG, RELATED INTERFACE PROTOCAL AND DISPLAY METHODS

(75) Inventors: Stanley J. Swartzel, Trotwood, OH (US); Kenneth M. Kiplinger, Tipp City, OH (US)

(73) Assignee: Illinois Tool Works Inc., Glenview, IL (US)

( * ) Notice: Subject to any disclaimer, the term of this patent is extended or adjusted under 35 U.S.C. 154(b) by 331 days.

(21) Appl. No.: 10/074,278

(22) Filed: Feb. 12, 2002

(65) Prior Publication Data

US 2002/0109593 A1 Aug. 15, 2002

Related U.S. Application Data

(60) Provisional application No. 60/269,160, filed on Feb. 15, 2001.

(51) Int. Cl.[7] .................................................. G08B 3/00
(52) U.S. Cl. .................... 340/691.6; 235/385; 340/5.92; 340/572.1; 705/28
(58) Field of Search ......................... 340/691.6, 572.1, 340/5.92; 235/375, 383, 385; 705/22, 28; 345/204

(56) References Cited

U.S. PATENT DOCUMENTS

| 4,002,886 | A | | 1/1977 | Sundelin | |
|---|---|---|---|---|---|
| 4,738,042 | A | * | 4/1988 | Corden et al. | 40/472 |
| 4,766,295 | A | * | 8/1988 | Davis et al. | 235/383 |
| 4,888,709 | A | | 12/1989 | Revesz et al. | |
| 5,083,638 | A | | 1/1992 | Schneider | |
| 5,151,684 | A | | 9/1992 | Johnsen | |
| 5,172,314 | A | | 12/1992 | Poland et al. | |
| 5,241,467 | A | * | 8/1993 | Failing et al. | 705/1 |
| 5,448,226 | A | | 9/1995 | Failing, Jr. et al. | |
| 5,467,474 | A | | 11/1995 | Ackerman et al. | |
| 5,537,126 | A | | 7/1996 | Kayser et al. | |
| 5,539,393 | A | * | 7/1996 | Barfod | 340/825.52 |
| 5,736,967 | A | | 4/1998 | Kayser et al. | |
| 5,797,131 | A | | 8/1998 | Goodwin, III et al. | |
| 5,850,187 | A | | 12/1998 | Carrender et al. | |
| 5,870,714 | A | | 2/1999 | Shetty et al. | |
| 5,873,069 | A | | 2/1999 | Reuhl et al. | |
| 5,880,449 | A | | 3/1999 | Teicher et al. | 235/383 |
| 5,898,383 | A | | 4/1999 | Forsythe | |
| 5,907,143 | A | | 5/1999 | Goodwin, III | |
| 5,926,797 | A | | 7/1999 | Goodwin, III | |
| 5,943,654 | A | | 8/1999 | Goodwin, III et al. | |
| 5,987,427 | A | | 11/1999 | Goodwin, III et al. | |
| 5,988,498 | A | | 11/1999 | Hoell | |
| 6,021,395 | A | | 2/2000 | Goodwin, III | |
| 6,089,453 | A | | 7/2000 | Kayser et al. | |
| 6,269,342 | B1 | * | 7/2001 | Brick et al. | 705/20 |
| 6,288,701 | B1 | * | 9/2001 | Karp | 345/685 |
| 6,335,686 | B1 | * | 1/2002 | Goff et al. | 340/572.4 |
| 6,552,663 | B2 | * | 4/2003 | Swartzel et al. | 340/572.1 |
| 2002/0038267 | A1 | * | 3/2002 | Can et al. | 705/28 |
| 2002/0138372 | A1 | * | 9/2002 | Ludtke | 705/27 |
| 2002/0167500 | A1 | * | 11/2002 | Gelbman | 345/204 |

* cited by examiner

*Primary Examiner*—Thomas Mullen
(74) *Attorney, Agent, or Firm*—Thompson Hine LLP (57) ABSTRACT

An advanced electronic product information display tag provides advanced functionalities and capabilities in electronic product information display systems.

23 Claims, 6 Drawing Sheets

ELECTRONIC DISPLAY SYSTEM TAG, RELATED INTERFACE PROTOCAL AND DISPLAY METHODS

CROSS REFERENCES TO RELATES APPLICATIONS

This application claims the benefit of U.S. Provisional Application No. 60/269,160 filed Feb. 15, 2001.

TECHNICAL FIELD

This application relates generally to electronic product information display systems, and more particularly to an improved tag configuration for electronic product information display systems and related methods.

BACKGROUND

Electronic product information display systems of a variety of types are known in the art. For example, U.S. Pat. No. 6,089,453 describes one embodiment of such a display system which utilizes inductive coupling between display tags and communication loops to power the tags and provide information to the tags. A reverse communication scheme using impedance modulation within a tag allows the tag to communicate information back to a controller which is also coupled to the communication loop or loops. Other electronic display systems use different schemes for communication between a controller and tags, such as RF communications or infrared communications or completely wired connections.

Regardless of the display system configuration, one commonality between prior systems is that the information displayed by tags, has been non-graphical information. Another commonality is that the size of tags used in such systems has typically been small, e.g., on the order of 2–4 inches in length, with each small tag being associated with only a single product. While such communication schemes and tags continue to be useful, improvements in such systems are continually being sought.

SUMMARY

In one aspect, a product information display system includes an electronic display tag mounted on a product shelf, the display tag including a display screen having a display width of at least two feet, the display tag operable to simultaneously display via the display screen at least both a first product and price message for a first product and a second product and price message for a second product which is different than the first product, the first and second product and price messages being displayed in a spaced apart manner.

In another aspect, a product information display system includes an electronic display tag mounted on a product shelf, the display tag including a display screen having a display width of at least two feet, the display tag operable to display information in a graphical, scrolling format.

In a further aspect, a product information display system includes an electronic display tag and controller. The electronic display tag is mounted on a product shelf, the display tag including a display screen having a display width of at least two feet, the tag including associated lateral position input means responsive to user contact. The controller is operable for communication with the tag. The tag and controller are operable in a facing input mode in which a user enters a product facing width and position of a given product by contacting the lateral position input means, the tag communicates the entered product facing width and position to the controller, and the controller stores the entered product facing width and position in a database and in association with the given product and the tag.

In yet another aspect, a product information display system includes an electronic display tag mounted on a product shelf, the display tag including a display screen having a display width of at least two feet, and a controller operable for communication with the tag. A database of stored plan-o-gram information including product facing set up information is provided. The tag and controller are operable in a facing set up mode in which the controller retrieves from the plan-o-gram database product facing set up information, communicates the retrieved information to the tag, and the tag displays facing set up margins on the display screen and product information between the set up margins for communicating shelf facing set up information to a user configuring or checking the product shelf.

In another aspect, a product information display system includes an electronic display tag mounted on a product shelf, the display tag including RF transceiver means, and a controller operable for communication with the tag. The controller and tag operable in a product stock check mode in which the tag transmits a localized RF signal for detecting RF ID tags associated with a given product, and the tag is further operable to communicate to the controller whether or not at least one RF ID tag associated with the given product was identified, the controller operable to initiate a restock check signal in the event that no RF ID tag associated with the given product is identified by the tag. In certain applications, this restock check signal could be a system generated message to an on-site or off-site person or persons via a personal pager, wireless telephone text message or email.

In yet a further aspect, a product information display system includes an electronic display tag mounted on a product shelf, the display tag including RF transceiver means, and a controller operable for communication with the tag. The controller and tag operable in a product stock check mode in which the tag transmits a localized RF signal for detecting RF ID tags associated with a given product, and the tag is further operable to communicate to the controller the number of detected RF ID tags associated with the given product, the controller operable to initiate a restock check signal in the event that the number of detected RF ID tags associated with the given product falls below a set threshold. In certain applications, this restock check signal could be a system generated message to an on-site or off-site person or persons via a personal pager, wireless telephone text message or email.

In still another aspect, a product information display system includes an electronic display tag mounted on a product shelf, the display tag including RF transceiver means. A controller is operable for communication with the tag. The tag and controller operable in a targeted merchandising mode in which the tag transmits a localized RF signal for detecting a consumer RF ID tag in the area, the tag operable to communicate detected consumer RF ID tag information to the controller, the controller operable to retrieve a targeted consumer message from a database based upon the received consumer RF ID tag information and to communicate the targeted consumer message to the tag, the tag operable to display the targeted consumer message received from the controller.

DETAILED DESCRIPTION

Figure 1:
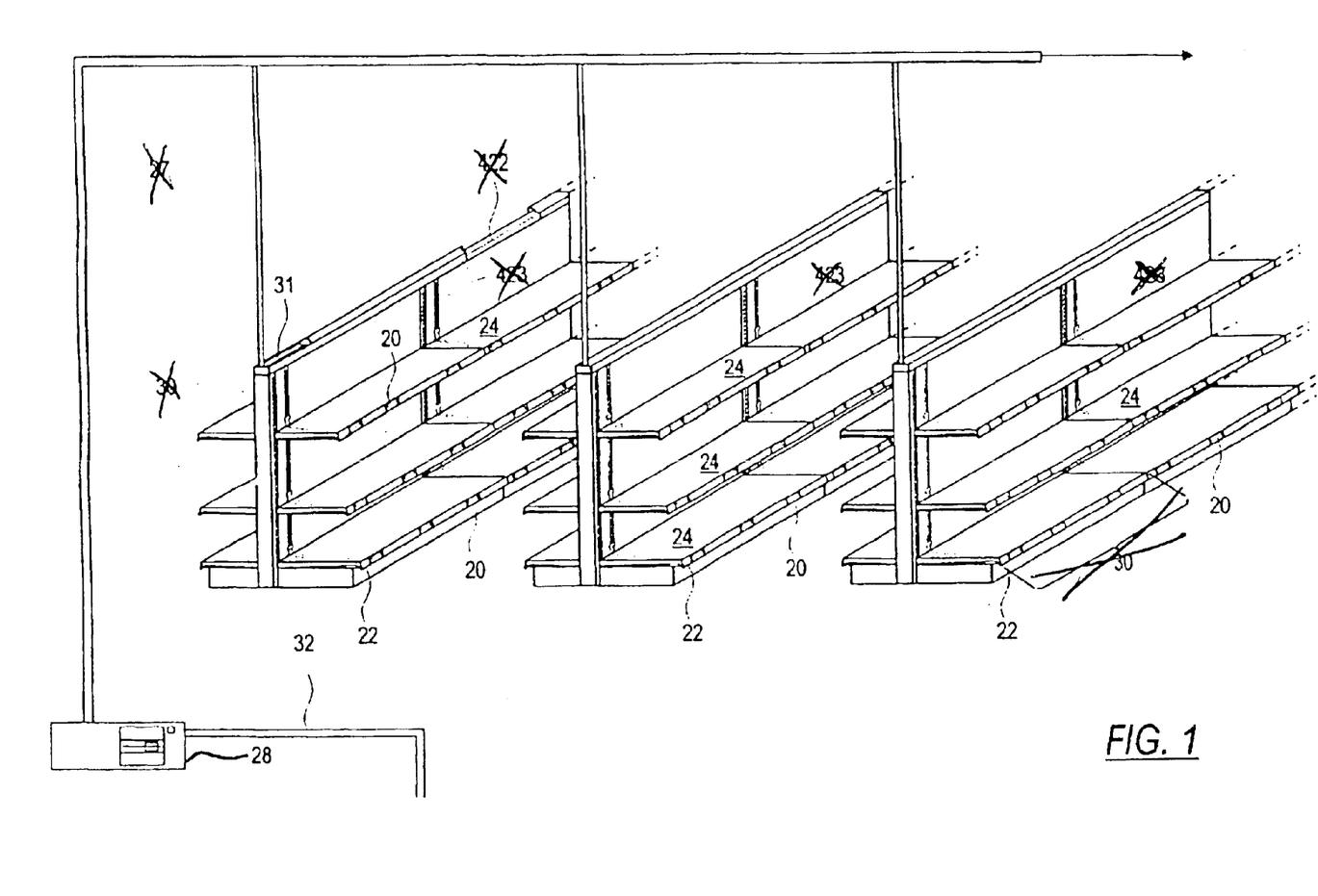
FIG. 1 is a perspective view of a typical layout of part of a retail store including an electronic product information display system.

FIG. 1 depicts part of a retail store including one embodiment of a product information display system arranged according to a preferred embodiment of the present invention. The system includes a plurality of display tags 20 disposed along the front rails 22 of the store's multiple display shelves 24. The prices descriptions and/or special information for all the products can be electronically displayed on the front edges of the shelves, near the respective products. Typically, there is a one-to-one correspondence between each display tag 20 and a particular item of merchandise. Although certain applications may require a display tag 20 to display product-related information regarding multiple products, e.g., the respective products above and below the display tag 20, preferably each display tag 20 displays information for only one product. The tags may also include sensing circuitry which detects the presence or movement of people in the vicinity of the tag. Information regarding movement can be used to alert store personnel to certain adverse situations. For example, the lack of movement of a person about a tag can alert the store personnel to possible shoplifting.

The information to be displayed at each display tag 20 is provided by a system controller (TSC) 28. A communication network is defined, in which the system controller 28 communicates with the display tags 20 through an area controller 31 using multiple conductors $C_1, C_2 \ldots C_n$ (see FIG. 2), each of which forms a loop to communicate with a large number of display tags 20 in a prescribed area. Typically a single area controller (TAC) 31 services at least a thousand tags, and each loop services several hundred tags. Preferably, there is one area controller per aisle; however, in an alternate embodiment one TAC exists for the entire store. Each area controller 31 is contained in an enclosed housing. The system controller 28 regularly communicates with the display tags for monitoring and reporting display tag failures to the system user and for identifying service inquiries and updating the display information, e.g., with price changes. The display tags served by any one of the wire loops are usually located on a number of different shelves.

Figure 2:
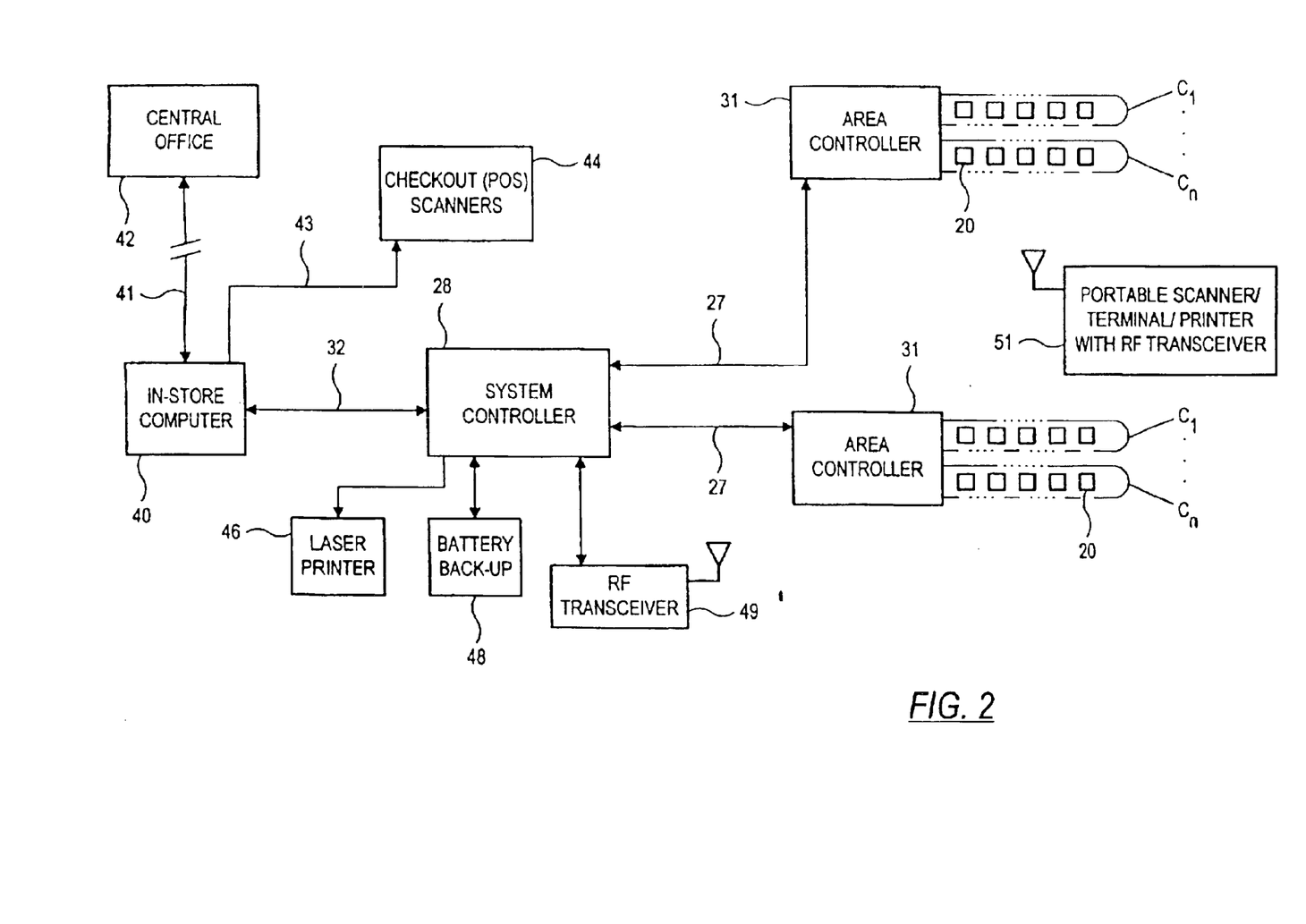
FIG. 2 is a schematic of an electronic product information display system.

FIG. 1 also illustrates a communication link 32 between the system controller 28 and an in-store computer 40 (see FIG. 2). This link 32 is also used by the system controller to receive update price information from the store computer 40 (FIG. 2). The same computer supplies data to both the tags and the scanners so that a new price for a particular product is updated in the display tag 20 at the same time the price is sent to the check-out scanners, thereby ensuring that the price displayed on the display tag 20 for the product is the same as the price displayed for and charged to the customer at the check-out scanner.

The system allows for central office control of the display tags. Employees at a central location can program all tags at all locations. Specifically, it is possible for one tag or one group of tags at one store to be changed from the central office. Additionally, when the system audits tags, the audit information is conveyed to the central office.

FIG. 2 illustrates the product information display system of FIG. 1 in block form. The system includes a plurality of area controllers 31 coupling the system controller 28 to various sets of display tags 20. Each set of display tags 20 is associated with one of the multiple wire loops $C_1$–$C_n$ connected to each area controller 31. According to one embodiment, each of the loops $C_1$–$C_n$ is a single loop of wire. According to another embodiment as shown in, each "loop" may be constructed from a number of modular components. Series loads are created allowing for the uniform distribution of power.

Referring again to FIG. 2, the area controllers 31 communicate with the tags 20 using the "loop" communication scheme described below. Alternatively, this communication can be undertaken using a conventional modulation protocol such as amplitude-shift-keying (ASK), which is a binary form of amplitude modulation. Other communication schemes, such as frequency shift keying (FSK) or phase modulation, can be used instead of ASK if desired.

Communication between the area controllers 31 and the system controller 28 is effected using a conventional serial two-way communication protocol, such as a network interface compatible with the RS422 or RS485 standard. Other protocols may be used. The system controller 28 is connected to the area controllers 31 using communication network lines 27.

Preferably communication between the system controller and the area controllers 31 is accomplished using a Safe Extra Low Voltage (SELV) which is designated by UL 1950 as typically being a voltage typically below 30 RMS volts, 42.4 volts peak, 60 V DC. Reference to UL 1950 is invited for a more complete description of SELV. By designing the system to be compatible with SELV requirements, the communications network lines 27 may be simply telephone cable. Use of a SELV and telephone wires is desirable because it reduces the cost of wiring and installation and simplifies reconfiguration of the network such as when one or more gondolas are moved within a store. One reason installation and reconfiguration costs are reduced is that electricians and 120 VAC rated elements such as conduit, junction boxes and the like need not be employed as would be the case in most non-SELV applications. Finally, compliance with UL 1950 also provides a level of safety for users of the system in the event of any malfunction of the system and meets many local building codes.

Each of the area controllers 31 is powered by a DC power supply within the system controller 28. Transmitting DC power signals between the system controller and the area controllers is advantageous because it reduces the amount of potentially interfering radiation which would otherwise be produced if AC power signals were employed. The scope of this benefit becomes evidenced when it is realized that there are a substantial number of communication lines between the system controller and the area controllers running throughout the ceiling of a store and from the ceiling down to each area controller. The use of DC power signals also conforms to standard off-the-shelf interfaces which contributes to a lower cost, more reliable system.

The system of FIG. 2 also includes an in-store computer 40 which communicates with a remotely located central office 42 using a modem or other type of communication link and with in-store check-out scanners 44. The in-store computer 40 provides a database of information, received from the central office 42 (or from a scanner controller), for all the merchandise in the store. The database is used to link each product with a physical location address, an alphanumeric (or UPC) description, a price and a unit cost and general inventory information. The database may be accessed for the check-out scanners 44 as well as the system controller 28. Changes in the database of the in-store computer 40 are generally initiated by updates received from the central office, but database changes producing display changes can also be made directly at the in-store computer 40.

After receiving the product data from the in-store computer 40, the system controller 28 selects the desired display information and associated display tag address, and converts this display information into a data stream for transmission to the appropriate area controller 31. The area controller 31 then forwards this information to the particular wire loop $C_1-C_n$, associated with the designated tag 20.

Also associated with the system controller 28 is a printer 46 and a battery back-up unit 48. The printer 46 may be used to make hard copies of the desired displays, for example on regular or transparent paper, for insertion into a shelf rail at any locations not covered by the electronic tags 20. The printer can also be used to generate store or system reports. These printed reports can be used to audit pricing strategy all the way down to individual shelves and tags. The battery back-up unit 48 is used to maintain system integrity during periods of power interruption.

Advantageously, in operation, in the system described above, the system controller can perform additional functions. For example, when actual price changes or other data are not being sent to the tags 20, the system controller can poll the tags to check on the integrity and correctness of the price and other information stored in the individual tags. As will be described more fully herein below, each of the tags 20 is provided with suitable memory capacity for retaining the necessary product and pricing information. The tags may also be provided with enough memory capacity to store alternative or secondary display information. Importantly, although the system controller is polling the individual tags to check this information, it can also poll the in-store computer 40 to compare the information on the tags with the pricing information for the corresponding items which has been sent by the in-store computer to respective point of sale (POS) or check-out scanners 44, for example at check-out counters or the like. Thus, the system controller when not engaged in other tasks preferably compares the data in the tags with the data being sent to the point of sale scanners to ensure that the two coincide, and to audit and update the information to the tags or to report any discrepancy in the event different information has been conveyed to the point of sale scanners. In such communications, the area controller performs CRCs on the data in the tags.

To facilitate installation of tags 20, an RF transceiver 49 coupled with the system controller may communicate with a portable scanner and terminal/printer with RF transceiver 51, such as a Telxon PTC 960 or other portable wireless terminal which is operable for communication with the TSC 28, carried by a worker in an aisle or other storage/display area. However, the RF transceiver 49 may already be provided with the in-store computer 56, as indicated by the dashed line, in which case, a separate RF transceiver need not be provided for the system controller 28.

Many of the details of the above-described system are provided in U.S. Pat. Nos. 5,537,126, 5,736,967 and 6,089, 453, the specifications of which are hereby incorporated by reference. Generally, a system controller (TSC) 28 provides power and information to multiple area controllers (TAC) 31. The area controller modulates power and data into a single power/information signal which is distributed over conduct $C_1-C_n$. Along each conductor a plurality of electronic display tags 20 are positioned for inductively receiving the power/information signal. The power/information signal is then demodulated within the tag. In this manner power is provided to all of the tags from the system controller and communication between the system controller 28 and tags 20 takes place.

Figure 3:
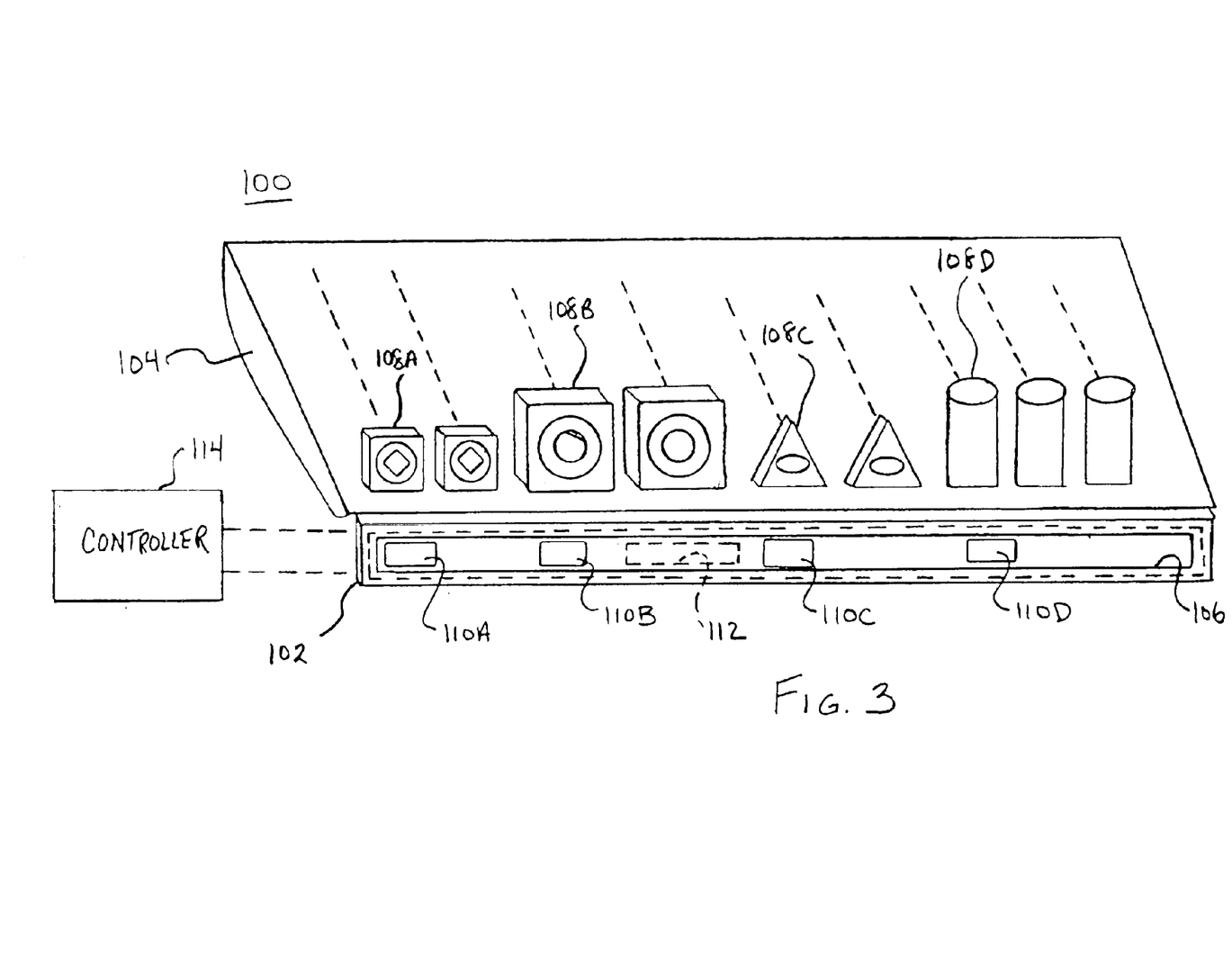
FIG. 3 depicts a product display/storage shelf including one embodiment of a display tag according to the invention.

Referring to FIG. 3 a front view of one embodiment a display system 100 is shown, the system including an electronic display tag 102 mounted on a product shelf 104, the display tag including a display screen 106 having a large display width. In preferred embodiments the display tag 102, or "I-rail" as such tag is also referred to herein, may have a width which is substantially the same as the width of the product shelf 104 as shown, with typical product shelves being formed in 2, 3, and 4 foot lengths. As shown, different portions of the tag display screen 106 align with different products 108A–108D positioned on the shelf. The display tag 102 is operable to simultaneously display via the display screen 106 multiple product and price messages 110A–110D, such as in the form of virtual tag displays as will be described below, which may be specific for different products on the shelf. The product and pricing messages 110A–110D are displayed in a spaced apart manner according to the position of the associated product on the shelf. Due to the number of facings for the products there extra display space between product and pricing messages 110A–110D enabling the display of other information or graphics 112 such as, advertising, other promotional messages, recipes, product use suggestions, or other information which may or may not be related to the products on the shelf 104 with which the particular tag 102 is associated.

Figure 5:
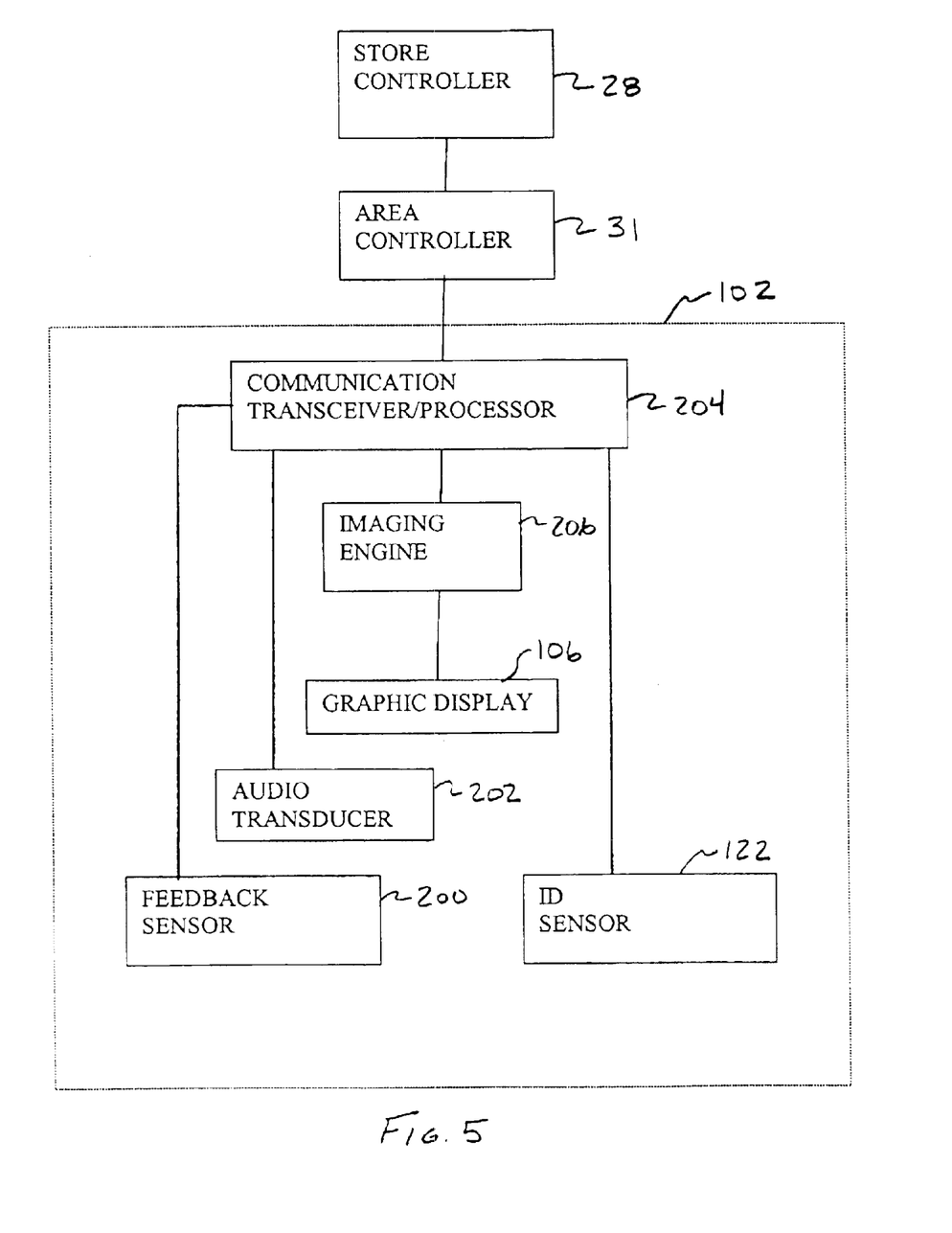
FIG. 5 depicts a schematic diagram of one embodiment of an electronic product information display including one embodiment of a tag according to the invention.

Referring to FIG. 5, with controller 114 represented by the combination of area controller 31 and system controller 28, a tag 102 includes a feedback sensor 200, an audio transducer 202, a communication transceiver/processor 204, an imaging engine 206 for producing graphical formats to be displayed on screen 106, and an ID sensor 122. It is recognized that a single controller could also be used. While an inductive coupling communication system is contemplated, other communication systems between the controller 114 and the I-rail tag 102 could be used, such as RF, infrared or hard-wired systems.

Referring again to FIG. 3, the display screen 106 may be an LCD type product, Eink type product, a light emitting polymer type product, a polymer LCD type product, or any display media that can display images by converting a modulated electrical signal into contrasting graphic elements that can be arranged to display textual and graphic information. Preferably the display screen 106 is formed to permit graphical displays such as design elements, scrolling displays (left to right, right to left, up to down, or down to up), and selection of numerous different fonts for displaying alphanumeric characters.

Where advanced graphical display information is to be communicated to the tag by a controller 114, it is possible that communication of bit-map data from the controller to the tag could be used. However, due to the large volume of data required to be transmitted in such a system, a high-level communication scheme might instead be used in which text based graphic commands drive the display imaging process. By way of example only, HTML type messages could be used for displaying information.

Figure 4:
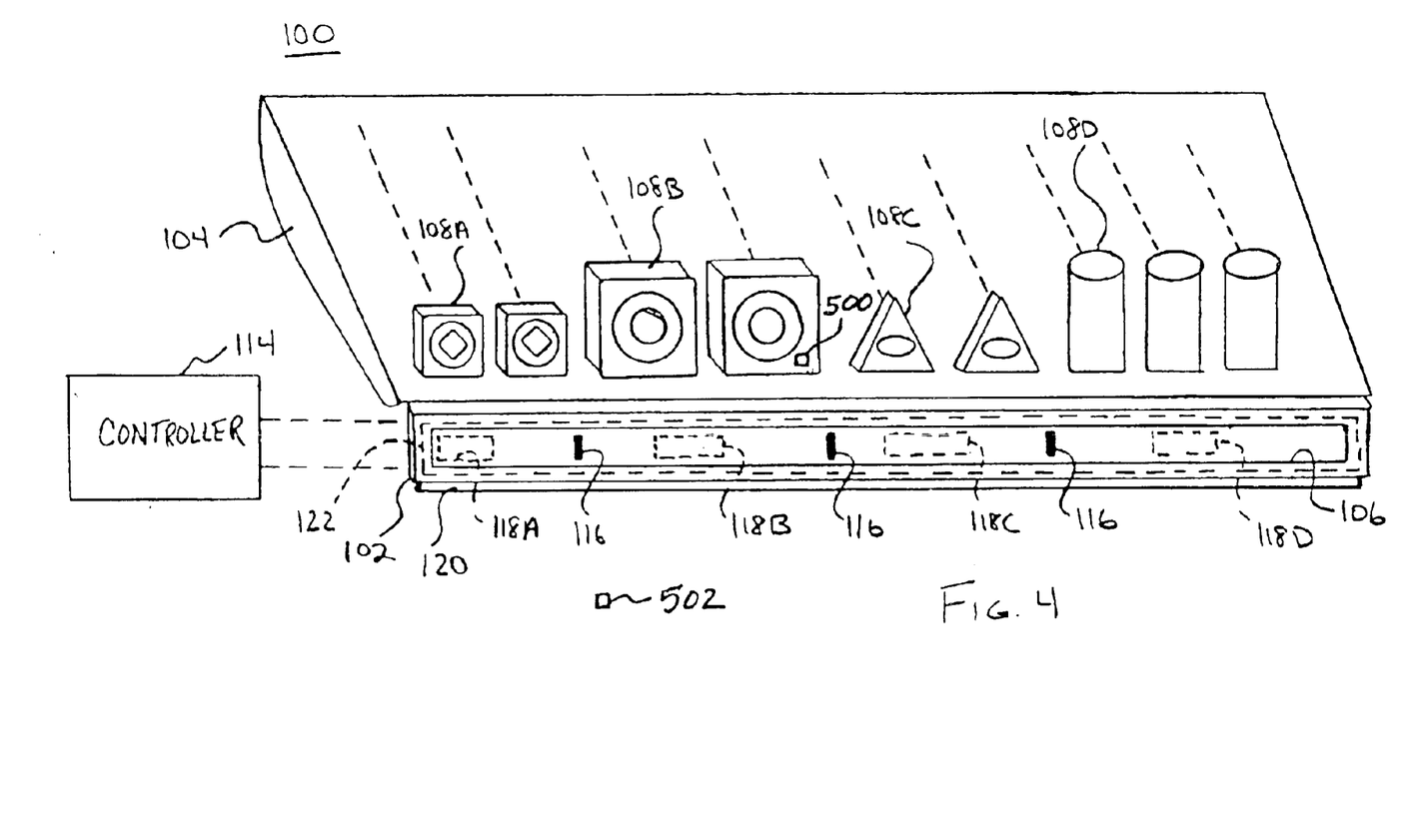
FIG. 4 depicts a product display/storage shelf including another embodiment of a display tag according to the invention.

The feed back sensor 200 in FIG. 5 in its simplest form may be a single switch on each I-Rail module 102. In more advanced embodiments the tag 102 may include associated lateral position input means responsive to user contact. The lateral position input means could, for example, be a touch sensitive strip 120 located on the front of the tag as shown in FIG. 4. In this case, a setup/calibration operation may be performed to associate input from the touch strip to horizontal display coordinates. Alternatively a touch sensitive display screen could be used as the lateral position input means.

The audio transducer 202 in FIG. 5 in its simplest form may be a single audible output device capable of issuing an audible beep for use in providing operator acknowledgment that the feedback sensor 200 has been actuated. In more advanced embodiments, the audio transducer may be capable of generating an audio stream that can provide additional promotional information for consumers or operational aids to in-store personnel.

In another embodiment of the product information display system the electronic display tag or I-rail 102 may include RF transceiver means 122 (such as a loop antenna of FIG. 4). The products on the shelf could each include an associated RF ID tag 500 attached thereto in the labeling or packaging. The RF ID tag for each product would provide distinct product identifying information readable using the RF transceiver 122 of the tag 102.

In another embodiment, consumers at the store location may be given an individualized RF ID tag 502. The tag 102 and controller 114 may be operable in a targeted merchandising mode in which the tag 102 transmits a localized RF or other electromagnetic signal (via transceiver 122 for example) for detecting a consumer RF ID tag 502 in the area, the tag 102 communicates detected consumer RF ID tag information to the controller 114, the controller 114 retrieves a targeted consumer message from a database based upon the received consumer RF ID tag information and communicates the targeted consumer message to the tag 102.

The I-Rail 102 may contain one or more "virtual tags" as reflected by areas 110A–110D in FIG. 3. A virtual tag will typically be associated with one and only one retail product, typically identified by a unique UPC (universal product code) or PLU (price look up) number.

The height of a virtual tag is limited by the vertical height of the display output device. The width of a virtual tag is flexible, driven by the desired width of product facings on the shelf. The width of a virtual tag is not limited to the horizontal width of the output device. It's width might span multiple physical I-Rail devices 102.

Figure 6:
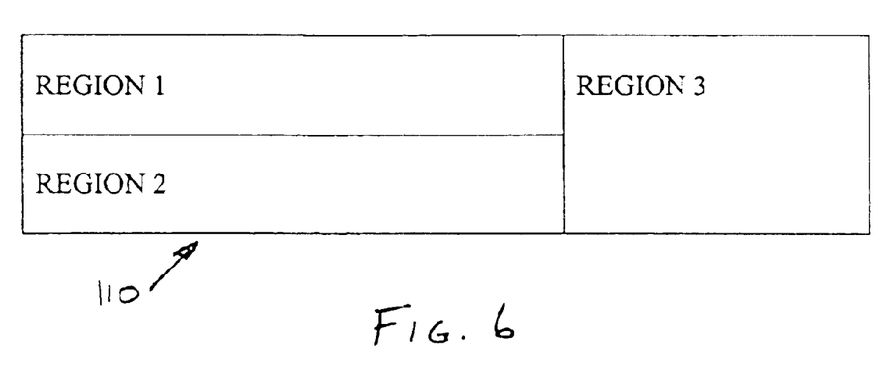
FIG. 6 depicts an exemplary virtual tag region layout.

Each virtual tag may have several display areas, referred to here as "regions" such as Region 1, Region 2 and Region 3 shown in FIG. 6. Each region may contain data pertinent to and specific to that region.

Each region may be composed of one or more "fields'. Each field may be made up of a single display element. Display elements may be static text, dynamic text, static graphic or dynamic graphic. Additionally, each display element can be designated a 'triggered' or 'untriggered' element. A triggered element is one in which an activation of the input sensor at the physical location of the virtual tag will generate a change in the display of the element. Additionally, a triggered element may also be triggered by the presence or absence of an RF ID tag (associated with a product, a consumer or in-store personnel).

Examples of each display element type are presented as follows:

Triggered Static Text

A static text display is presented in a field. When triggered, a secondary static or dynamic text display (if available) is presented. After a configurable time delay, the original display is restored.

Untriggered Static Text

A static text display is presented in a field. After a configurable time delay, a secondary static or dynamic text display (if available) is presented. After a configurable time delay, the original display is restored and the cycle repeats.

Triggered Dynamic Text

A dynamic text (marquee type) display is presented in a field. When triggered, a secondary static or dynamic text display (if available) is presented. After a configurable time delay, the original display is restored.

Untriggered Dynamic Text

A dynamic text (marquee type) display is presented in a field. After a configurable time delay, a secondary static or dynamic text display (if available) is presented. After a configurable time delay, the original display is restored and the cycle repeats.

Triggered Static Graphic

A static graphic display is presented in a field. When triggered, a secondary static or dynamic graphic display (if available) is presented. After a configurable time delay, the original display is restored.

Untriggered Static Graphic

A static graphic display is presented in a field. After a configurable time delay, a secondary static or dynamic graphic display (if available) is presented. After a configurable time delay, the original display is restored and the cycle repeats.

Triggered Dynamic Graphic

A dynamic graphic (animated) display is presented in a field. When triggered, a secondary static or dynamic graphic display (if available) is presented. After a configurable time delay, the original display is restored.

Untriggered Dynamic Graphic

A dynamic graphic (animated) display is presented in a field. After a configurable time delay, a secondary static or dynamic graphic display (if available) is presented. After a configurable time delay, the original display is restored and the cycle repeats.

Regions may be of a fixed or variable size, relative to the size of the virtual tag. The layout of regions on a given virtual tag may vary from that of other virtual tags in the system, however a consistent virtual tag display layout will typically be desired.

In the event that a very narrow virtual tag is required, some regions may not be typically displayed. Alternatively, each region may be presented on the virtual tag, in sequence, such that all desired information is displayed on each tag, regardless of physical width of the virtual tag.

A typical virtual tag region layout is presented in FIG. 6 for clarification and discussion although many other layouts are possible.

Region 1—Product Identification Region:

This region is used to identify the product associated with this virtual tag. It may typically contain product description and size. Alternatively, the product identifier (UPC or PLU number) may be displayed.

Region 2—Product Information Region:

This region is used to present appropriate product information associated with this virtual tag. Many data options are possible. The simplest and most common will be display of retail quantity and price information. Alternatively, tiered pricing can be displayed statically, along side the normal retail price and quantity, or, if the virtual tag width does not make this practical, the two displays can be successively alternated in this region. Sale price or display of competitor pricing can be similarly displayed. This type of data is typically presented for the benefit of the end consumer (shopper).

Additionally, information pertinent to in-store personnel can be presented in this region. Examples of this type of data include, but are not limited to, effective date of change, case count, item movement, facings, total pack (to fill shelf), horizontal facings, vertical facings, last reorder quantity, expected date of future delivery, or the like.

Region 3—Promotional Information Region:

This region will contain promotional information, typically graphical in nature. This region may be driven in a tiered data approach that allows item specific presentation if available or more general information if item specific information is not available.

A representative example is presented for clarification and discussion. If appropriate, an item (or virtual tag) specific attractor may be presented in region 3 to facilitate stock-to-light, pick-to-light, product set (facings or location) adjustment or other in-store operations in which the system must lead an operator to a specific virtual tag location. In this case, the region will typically animate or flash to draw attention to itself. (Example: "Here" graphic)

Otherwise, an item specific promotional display may be presented in region 3 if available for use by the consumer (shopper). This display will typically be static, however an animated or real-time video display may be shown when the input sensor appropriate to this virtual tag is actuated. (Example: "Extra Absorbent" graphic).

Otherwise, an item specific "batch type" may be presented in region 3 in which new items, frequent shopper (or club) items, sale items or the like can be identified. (Example: "New Item" graphic)

Otherwise, a manufacturer specific display may be presented in region 3 if available. (Example: "Nabisco" graphic)

Otherwise, a store zone specific display may be presented in region 3 if available. (Example: "Dairy Fresh" graphic)

Otherwise, a seasonal display may be presented in region 3 if available. (Example: "Happy Holidays" graphic)

Otherwise, a store graphic may be presented in region 3. (Example: "Joe's Market" graphic)

Alternatively, two or more of the above graphics, if available, can be continuously cycled.

Each virtual tag may have vertical bars to designate the horizontal boarders of the virtual tag. This will typically be the left and right extents of the desired product set on the shelf, however in the event that product set information is not available, the width of the virtual tag display layout associated with that tag is used.

In the typical case, a virtual tag may have a physical width (as defined by the product set on the shelf) and a display width (as defined by the virtual tag display layout). The virtual tag display can be left, right or center justified in the physical width of the virtual tag or it can be replicated (horizontally) over the width of the virtual tag.

Virtual Tag Position

Position of a given virtual tag horizontally on the I-rail may be determined in a number of ways. For example, a given virtual tag may have an absolute position on the I-Rail, a relative position left of the virtual tag to it's immediate right, or a floating position which adjusts to the right edge of the virtual tag to it's left.

System Operation

Normal/Run Mode

In normal/run mode virtual tag displays may display data as defined by the item associated with that tag, using the region template associated with that tag. Virtual tag displays fields may animate based on their element types and any pending display trigger events (Product or customer ID sensor or feedback sensor). This may include a single price display or multiple price displays as defined by a tiered pricing scheme of the store being operated in.

In addition, the feedback sensor 200 and the RFID sensor 122 for each product is periodically scanned and reported to the controller. The controller 114 and tag 102 are operable such that the tag transmits a localized RF or other electromagnetic signal for detecting product ID tags associated with a given product. The tag 102 is further operable to communicate to the controller 114 whether or not at least one RF ID tag associated with the given product was identified. The controller 114 is operable to initiate a restock check signal in the event that no product ID tag associated with the given product is identified by the tag 102. The restock check signal will notify the store personnel that the item needs to be restocked on the shelf. In a more advanced system the tag may be operable to communicate to the controller 114 the number of detected product ID tags associated with the given product, and the controller 114 may be operable to initiate a restock check signal in the event that the number of detected ID tags associated with the given product falls below a set threshold.

Shelf Maintenance/Tag Setup Mode

In maintenance/setup mode virtual tags are created and associated with a specific product. Additionally a region template is (either manually or automatically) associated with this tag. Also in this mode, product set and facing information can be verified or entered.

Referring to FIG. 4, in one embodiment a product information display system including one or more large tags 102 as provided herein operates in a product facing set up capacity with the controller 114 which is operable for communication with the tag 102. The controller 114 has access to a database of stored plan-o-gram information including product facing set up information. In the facing set up mode the tag 102 and controller 114 are operable such that the controller 114 retrieves from the plan-o-gram database product facing set up information, communicates the retrieved information to the tag 102, and the tag displays facing set up margins 116 on the display screen 106 and product information 118A-118D between the set up margins 116 for communicating shelf facing set up information to a user configuring or checking the product shelf. The facing set up margins 116 may be displayed as vertical bars and the product information may be at least the identity of the product to be faced between the set up margins 116. The stored plan-o-gram information will typically include data identifying the appropriate position for the set up margins 116, data identifying each product to be positioned between the margins (product name, size, number of facings), and data relating the stored information to particular tags 102. In one embodiment the facing set up mode may be used by store personnel to initially set up the products on shelves, and in another embodiment the facing set up mode may be used by store personnel to verify that the shelf is set up correctly.

The plan-o-gram database may be generated according to an automated sales or profit optimization scheme. In such an environment the present system facilitates shelf reconfiguration for special purposes as desired to maximize sales or profits, such as making adjustments during certain periods (weekends or holidays) when certain products are in greater demand.

Realogram/Planogram Verify Mode

Using such tag 102 and operating the tag 102 and controller 114 in a facing input mode, the display system provides the ability to adjust a stored plan-o-gram database as needed. For example, the user enters a product facing width and position of a given product by contacting the lateral position input means 120, the tag 102 communicates the entered product facing width and position to the controller 114, and the controller 114 stores the entered product facing width and position in a database and in association with the given product and the particular tag 102. This technique may be particularly useful when comparing a stored plan-o-gram to the actual shelf set up. Moreover, where the stored plan-o-gram being used to initially set up the products on shelves turns out to be incorrect in some way, the user may input the actual facing margins for a given product using the lateral position input means 120, the actual facing margins can be communicated to the controller 114, the controller can readjust the remainder of the plan-o-gram database as necessary, and resend the plan-o-gram information to the store tags 102.

Check Signals

Check signals may be system generated messages to an on-site or off-site person or persons via a personal pager, wireless telephone text message or email. These messages may, for example, be for the purpose of signaling out-of-stock conditions, system component failure or other required maintenance (for example, replacing a missing tag).

Methods by which the system or controller initiates transmission of pager and text message check signals might include a modem directly connected to the system (specifically the TSC in one embodiment) as well as a network based dial-out facility. In the case of email based check signals, methods by which the system or controller initiates transmission might include use of a modem directly connected to the system (specifically the TSC in one embodiment) as well as network based facilities.

Check signals may contain specific information as to the nature of service required and the specific physical area of the store and or/product that requires attention. For example, a pager message that indicates an out of stock condition in aisle 3A, section 4, shelf 3 might be presented as "5*31*04*03", where 5 indicates "Stocking Required" (5 looks like an "S" on a pager), 31 indicates aisle 3A, 04 indicates section 4, 03 indicates shelf three and the "*" character is used to separate fields. Possible data presentable in a check signal may include the location of the product, the UPC (or other identifier) of the product, the number of cases to fill the shelf, an indication that a substitute product should be placed at this location or other data maintained by or available to the system. Additionally check signals may indicate other specific actions required for this item or location (other than re-stock), for example, the electronic tag is missing and should be fixed/replaced or in the event of multiple tags being missing on the same shelf, indicating through a check message that a specific coupler be fixed, etc.

Check signals may be targeted for use for different purposes by field/service personnel, on-site workers, on-site managers, off-site managers, corporate personnel and vendors/suppliers.

Check signals may be managed such that the system prevents redundant or repeated signals from being sent to a given recipient. Further, a prioritization scheme may be implemented such that if multiple check signals are pending, they are prioritized based on a configurable criteria. One example of this may be to sort pending requests by manufacturer. If a given manufacturer is deemed "preferential" as a result of a business relationship or via a paid subscription, that manufacturers out of stock conditions (as one example) be sent before other restocking signals are issued. Other examples would be to sort pending out-of-stock signals based on profit margin or "sale item" status.

Check signals may be further managed such that required shelf or item maintenance is "load balanced" such that available personnel are efficiently utilized. For example, on-duty stock clerks known to the system are sent check messages in such a way that multiple clerks are simultaneously deployed to different areas of the store without duplication between clerks. Alternatively, the system may direct messages for a given area of the store to the person who is responsible for that area.

Check signals may be further managed such that the system has the ability to send all pending requests to a single clerk, a set of clerks each with their own (non-overlapping) tasks or to a set of clerks by areas of responsibility in "batch" mode (all pending requests at once) or in "handshake" mode, such that after each item is stocked, the next restock check message is sent. Optionally, a configurable number of "pending" requests can be specified such that a specific message recipient will never have more than that number of pending requests at any given time. As each item is restocked (or otherwise appropriately handled), another message will be sent until all conditions that require attention are handled.

Check signals may be further managed such that the system has the ability to handle pager messages in a hierarchically timed fashion such that if a restock request (as one example) is not performed in a configurable amount of time, a second message will be sent for example to the same or a different clerk. If the request is still not performed in a configurable amount of time a third message will be sent for example to an appropriate manager. The hierarchy and timing of message transmission may be completely configurable. The "depth" of the hierarchy effectively has no technical limits (such that there could be as may as several hundred or more re-transmissions to different recipients over time if the request is not handled in a configurable amount of time), however practical limits will likely be put in place to limit the hierarchy "depth" to 10 or so.

Check message statistics may be accumulated and maintained by the system such that the system can generate hourly, daily, weekly or any other configurable amount of time, summaries and send them via email or a locally generated report of all sent check signals (and confirmation of their being handled) organized by time, by time latency between issuing the check signal and it's being handled, by area of the store, by manufacturer, by clerk, or with any combination of the above.

These and other advantages may be obtained. Where a large size tag is used, power consumption may be a major concern and therefore use of an inductive coupling arrangement as described in U.S. Pat. No. 6,089,453 may be particularly preferred for powering the tag, as opposed to battery powered tags. However, as advances in battery technology and solar cell technology are made it is possible that large, battery powered and/or solar powered tags will be commercially feasible.

What is claimed is:

1. A product information display system comprising:
   an electronic display tag mounted on a product shelf, the display tag including a display screen having a display width of at least two feet, the display tag operable to simultaneously display via the display screen at least both a first product and price message for a first product and a second product and price message for a second product which is different than the first product, the first and second product and price messages being displayed in a spaced apart manner.

2. The system of claim 1 wherein the tag is further operable to display advertising information simultaneously with the product and pricing messages.

3. The system of claim 1 wherein the display tag displays at least some message information in a graphical format.

4. The system of claim 1 wherein a tag width is substantially the same as a width of the product shelf.

5. A product information display system comprising:
an electronic display tag mounted on a product shelf, the display tag including a display screen having a display width of at least two feet, the display tag operable to display information in a graphical, scrolling format.

6. The system of claim 5 wherein a first section of the display screen displays a scrolling message and a second section of the display screen displays a constant product and price message.

7. A product information display system comprising:
an electronic display tag mounted on a product shelf, the display tag including a display screen having a display width of at least two feet, the tag including associated lateral position input means responsive to user contact;
a controller operable for communication with the tag;
wherein the tag and controller are operable in a facing input mode in which a user enters a product facing width and position of a given product by contacting the lateral position input means, the tag communicates the entered product facing width and position to the controller, and the controller stores the entered product facing width and position in a database and in association with the given product and the tag.

8. The system of claim 7 wherein the tag and controller are operable in a facing set up mode in which the controller retrieves from the database product facing width and position information associated with the tag, communicates the retrieved information to the tag, and the tag displays facing set up margins on the display screen and product information between the set up margins for communicating shelf facing set up information to a user configuring the product shelf.

9. The system of claim 8 wherein the set up margins comprise vertically displayed bars on the display screen.

10. A product information display system comprising:
an electronic display tag mounted on a product shelf, the display tag including a display screen having a display width of at least two feet;
a controller operable for communication with the tag;
a database of stored plan-o-gram information including product facing set up information;
wherein the tag and controller are operable in a facing set up mode in which the controller retrieves from the plan-o-gram database product facing set up information, communicates the retrieved information to the tag, and the tag displays facing set up margins on the display screen and product information between the set up margins for communicating shelf facing set up information to a user configuring or checking the product shelf.

11. A product information display system comprising:
an electronic display tag mounted on a product shelf, the display tag including RF transceiver means;
a controller operable for communication with the display tag;
the controller and tag operable in a product stock check mode in which the display tag transmits a localized RF signal for detecting RF ID tags associated with a given product, and the display tag is further operable to communicate to the controller whether or not at least one RF ID tag associated with the given product was identified, the controller operable to initiate a restock check signal in the event that no RF ID tag associated with the given product is identified by the display tag;
wherein the restock check signal is sent to an electronic device associated with a specific user and the electronic device is one of a pager and cell phone.

12. A product information display system comprising:
an electronic display tag mounted on a product shelf, the display tag including RF transceiver means;
a controller operable for communication with the display tag;
the controller and tag operable in a product stock check mode in which the display tag transmits a localized RF signal for detecting RF ID tags associated with a given product, and the display tag is further operable to communicate to the controller whether or not at least one RF ID tag associated with the given product was identified, the controller operable to initiate a restock check signal in the event that no RF ID tag associated with the given product is identified by the display tag;
wherein the controller is operable at least one additional time after initiating the restock check signal to operate with the display tag to transmit a localized RF signal for detecting RF ID tags associated with the given product, the display tag communicates to the controller whether or not at least one RF ID tag associated with the given product was identified, and the controller is operable to initiate another restock check signal in the event that no RF ID tag associated with the given product is identified by the display tag.

13. The system of claim 12 wherein the restock check signal is directed to a first user and the another restock check signal is directed to a second user.

14. The system of claim 13 wherein the controller is operable to maintain a log of restock check signals.

15. A product information display system comprising:
an electronic display tag mounted on a product shelf, the display tag including RF transceiver means;
a controller operable for communication with the display tag;
the controller and tag operable in a product stock check mode in which the display tag transmits a localized RF signal for detecting RF ID tags associated with a given product, and the display tag is further operable to communicate to the controller the number of detected RF ID tags associated with the given product, the controller operable to initiate a restock check signal in the event that the number of detected RF ID tags associated with the given product falls below a set threshold,
wherein the restock check signal is sent to an electronic device associated with a specific user and wherein the electronic device is one of a pager and cell phone.

16. A product information display system comprising:
an electronic display tag mounted on a product shelf, the display tag including RF transceiver means;
a controller operable for communication with the display tag;

the controller and tag operable in a product stock check mode in which the display tag transmits a localized RF signal for detecting RF ID tags associated with a given product, and the display tag is further operable to communicate to the controller the number of detected RF ID tags associated with the given product, the controller operable to initiate a restock check signal in the event that the number of detected RF ID tags associated with the given product falls below a set threshold, wherein the controller is operable at least one additional time after initiating the restock check signal to operate with the display tag to transmit a localized RF signal for detecting RF ID tags associated with the given product, the display tag communicates to the controller whether or not at least one RF ID tag associated with the given product was identified, and the controller is operable to initiate another restock check signal in the event that no RF ID tag associated with the given product is identified by the display tag.

17. The system of claim 16 wherein the restock check signal is directed to a first user and the another restock check signal is directed to a second user.

18. A product information display system comprising:

an electronic display tag mounted on a product shelf, the display tag including RF transceiver means;

a controller operable for communication with the display tag;

the display tag and controller operable in a targeted merchandising mode in which the display tag transmits a localized RF signal for detecting a consumer RF ID tag in the area, the display tag operable to communicate detected consumer RF ID tag information to the controller, the controller operable to retrieve a targeted consumer message from a database based upon the received consumer RF ID tag information and to communicate the targeted consumer message to the display tag, the display tag operable to display the targeted consumer message received from the controller.

19. In a product information display system utilized in connection with a store including product shelves and associated electronic display tags mounted on the product shelves for displaying product information, a method of generating one or more check signals comprising the steps of:

electronically determining a product stock condition of a given product on a given shelf;

identifying a user to notify regarding the product stock condition;

initiating a check signal to the user including data regarding location of the given product, wherein the check signal is directed to the user via one of an email or a page.

20. In a product information display system utilized in connection with a store including product shelves and associated electronic display tags mounted on the product shelves for displaying product information, a method of generating one or more check signals comprising the steps of:

electronically determining a product stock condition of a given product on a given shelf;

identifying a user to notify regarding the product stock condition;

initiating a check signal to the user including data regarding location of the given product, after a certain time period, electronically determining whether the product stock condition still exists;

initiating another check signal if the product stock condition still exists.

21. The method of claim 20 wherein the another check signal is sent to a second user.

22. The method of claim 20 including maintaining an electronic record of generated check signals.

23. The method of claim 20 wherein the check signal includes information identifying the given product.

* * * * *